March 17, 1959      J. PEAT      2,877,722
CANOPIED VEHICLE
Filed Oct. 12, 1955      3 Sheets-Sheet 1
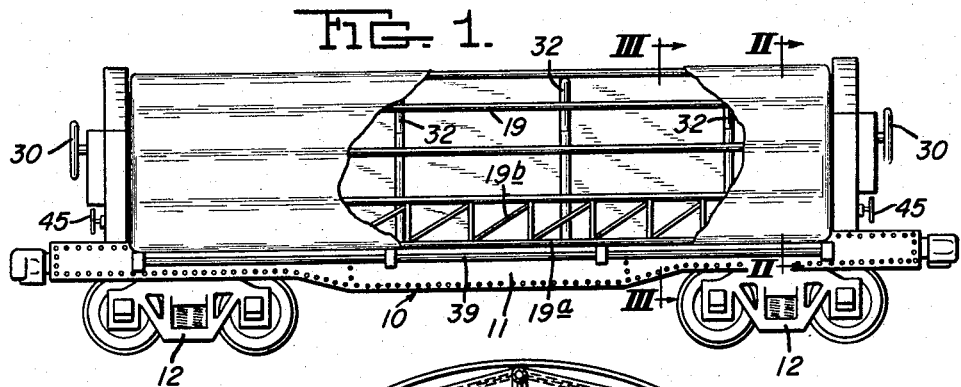
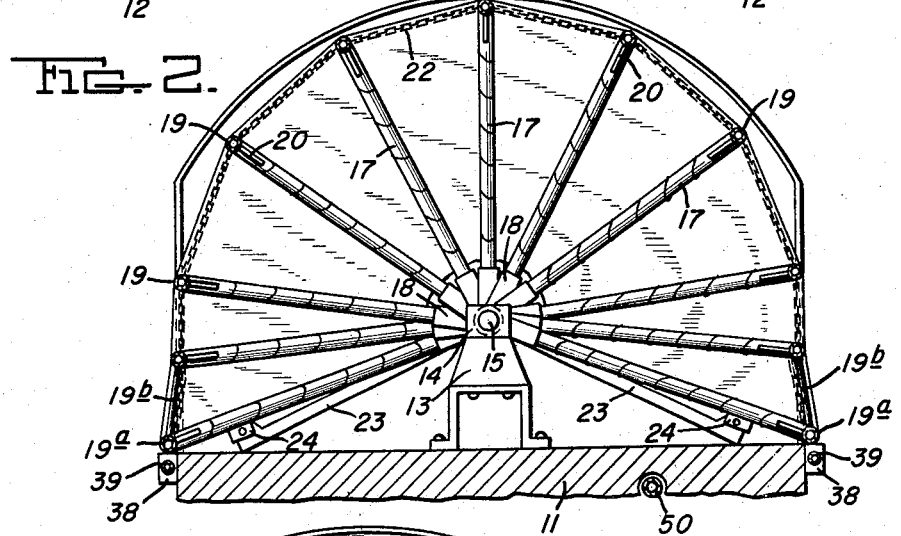
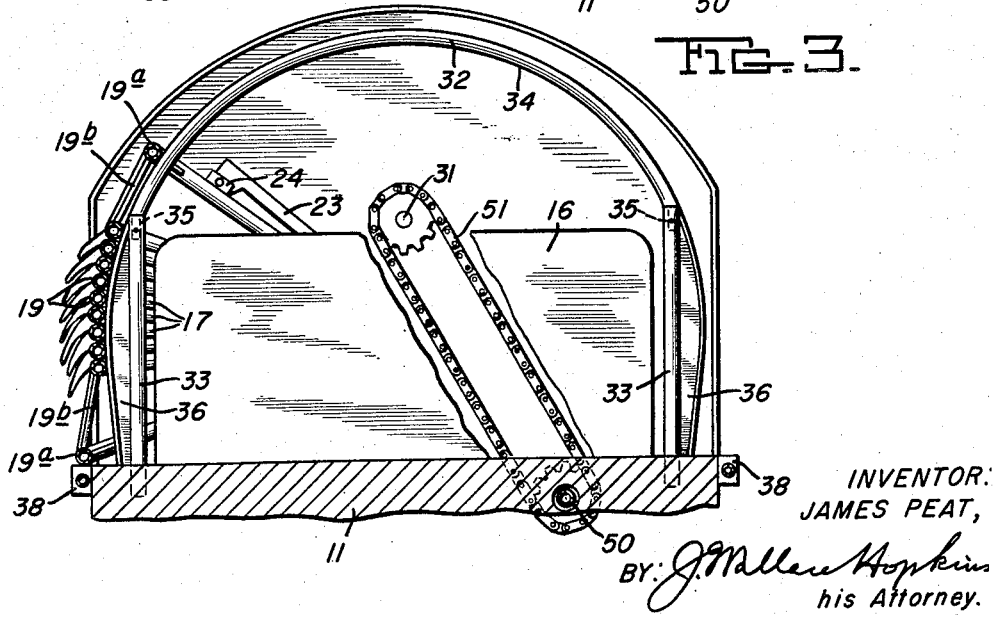
INVENTOR:
JAMES PEAT,
BY his Attorney.

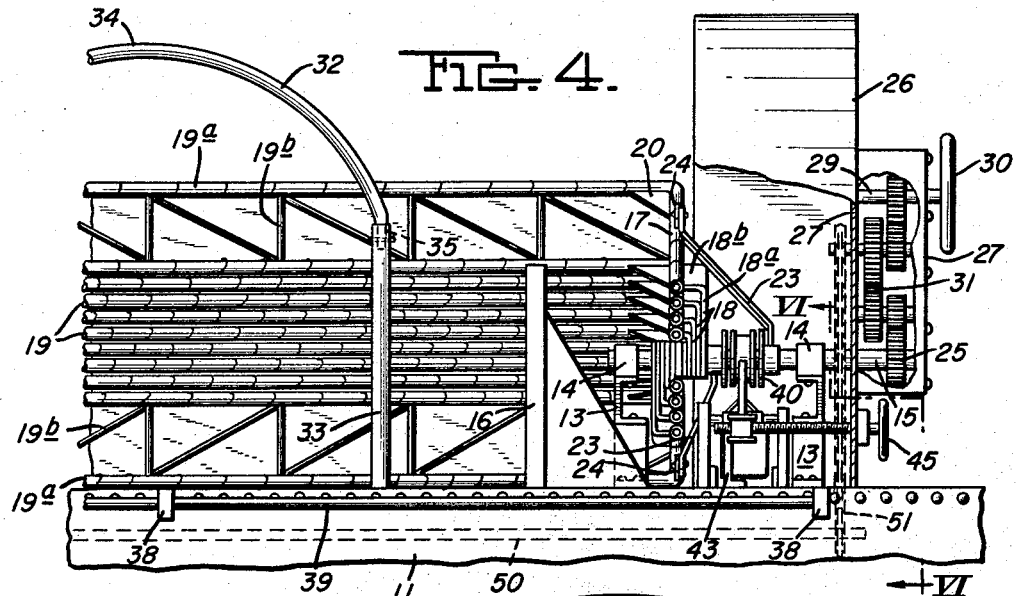
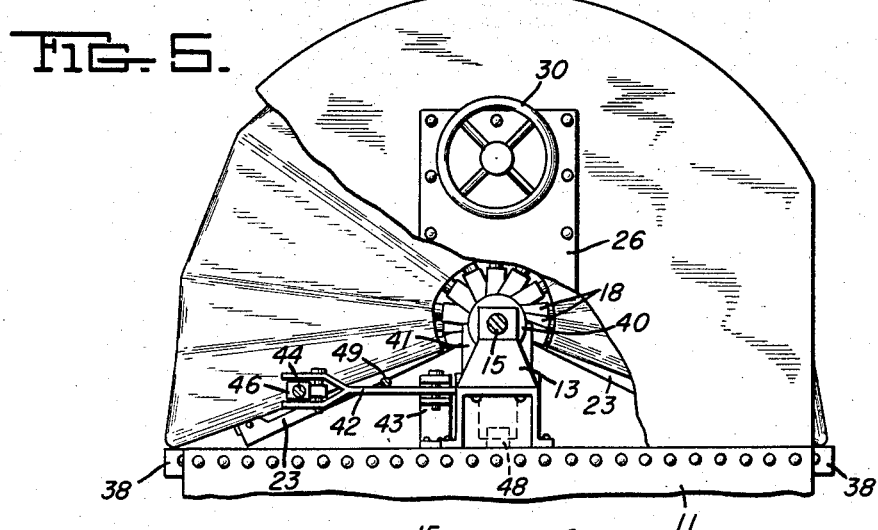
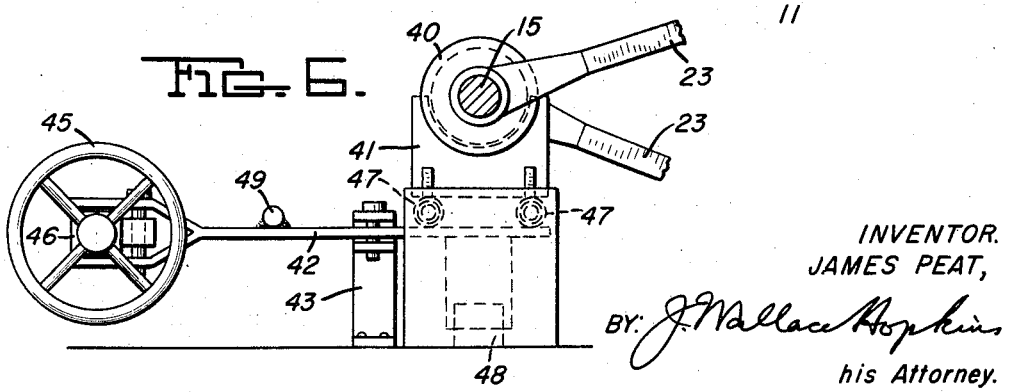
INVENTOR.
JAMES PEAT,
BY: his Attorney.

March 17, 1959  J. PEAT  2,877,722
CANOPIED VEHICLE
Filed Oct. 12, 1955  3 Sheets-Sheet 3
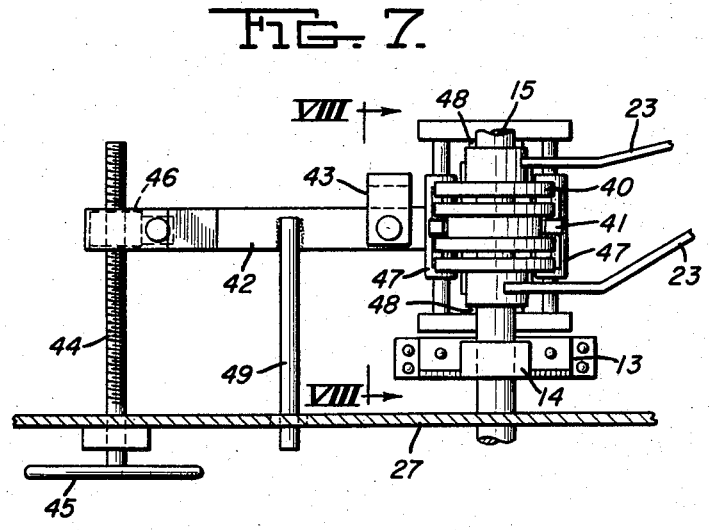
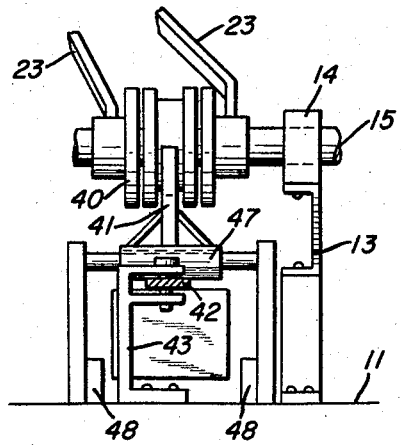
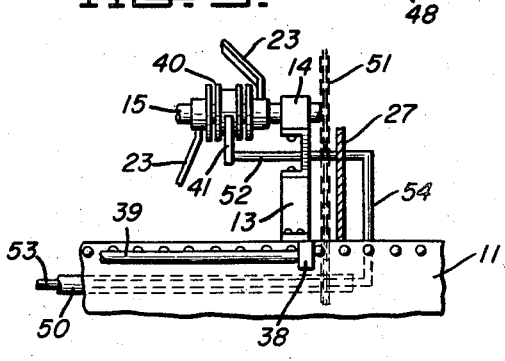
INVENTOR:
JAMES PEAT
BY: J. Wallace Hopkins
his Attorney.

United States Patent Office 2,877,722
Patented Mar. 17, 1959

2,877,722

CANOPIED VEHICLE

James Peat, Pittsburgh, Pa., assignor to Union Railroad Company, a corporation of Pennsylvania Application October 12, 1955, Serial No. 540,025

6 Claims. (Cl. 105—377)

This invention relates to a canopied vehicle, particularly a railroad car, but the principle thereof is also applicable to vehicles of other types.

Certain products, notably the flat-rolled products of the steel industry, can be loaded onto and off of transport vehicles most easily by the use of an overhead crane. In the case of transportation by rail, this necessitates the use of flat cars or gondola cars for such shipments. As a result, the products are exposed to the weather during shipment except as they may be protected by wrapping with suitable material. Such material is not readily salvageable and therefore represents a dead loss. It is also subject to failure by tearing with consequent loss of protection. Some products, furthermore, are not susceptible to even this limited protection because of their shape or size.

The object of my invention is to provide a transport vehicle, specifically a railroad car having a load-carrying body and a self-contained, flexible, weather-proof cover with mechanical means for raising and lowering it, whereby a load disposed on the body may be quickly and easily placed under shelter and just as easily exposed for unloading.

For the achievement of the foregoing object, I have invented a canopied vehicle, e. g., a flat car, comprising a body with a cover and a frame for supporting it thereon, the frame being of such character that it may be lowered and folded back to a collapsed position for loading and unloading operations and yet can easily be raised or extended to stretch the cover entirely around the load, so as to afford complete protection from rain, snow, dust, etc. In a preferred embodiment, I provide a pair of shafts journaled longitudinally of the car body, one adjacent each end thereof, at a suitable height above the floor. A group of stanchions is journaled on each shaft so as to open up fanwise, and ribs or splints extending longitudinally of the car are secured to the outer ends of corresponding stranchions of the two groups. A flexible cover of canvas or other suitable material is laced to the ribs.

Bows extending transversely of the car are spaced therealong to support the ribs slidingly at points intermediate the groups of stanchions. A crank arm mounted on each shaft is connected to one of the stanchions of each group which is lowermost when the canopy is extended. Drive mechanisms for the arms, manually operable from the ends of the car, permit a side edge of the canopy to be pulled up and over the bows from the collapsed position on one side of the car, to stretch the cover and enclose the load. The drive mechanisms also permit either side of the cover to be pulled up from the lowered or stretched position and folded back or collapsed on the other side.

A complete understanding of the invention may be obtained from the following detailed description and explanation which refer to the accompanying drawings illustrating the present preferred embodiment.

In the drawings:

Figure 1 is a side elevation showing the invention embodied in a flat car, with the canopy in closed or stretched position and partially broken away;

Figure 2 is a transverse section taken along the plane of line II—II of Figure 1;

Figure 3 is a similar section taken along the plane of line III—III of Figure 1, showing the canopy in retracted or open position;

Figure 4 is a partial elevation showing the cover in open or folded-back position;

Figure 5 is an end elevation with parts broken away showing the canopy in closed position;

Figure 6 is a partial section taken along the line VI—VI of Figure 4;

Figure 7 is a partial plan view showing a clutch actuator;

Figure 8 is a section taken along the line VIII—VIII of Figure 7; and

Figure 9 is a partial view similar to Figure 4 showing a modification.

Referring now in detail to the drawings, a flat car 10 of substantially conventional construction, including a body 11 mounted on wheeled trucks 12, has a pair of spaced bearing standards 13 mounted on the floor or deck thereof adjacent each end. The standards are provided with bearings 14 in which shafts 15 are journaled coaxially and longitudinally of the car, substantially on the center line thereof. A pair of bulkheads 16 upstanding on the car floor and spaced inwardly of the inner standard 13 of each pair, define a lading space therebetween and prevent the load from shifting into engagement with the standards or shafts.

A group of radial arms or stanchions 17 is journaled on each shaft 15 by means of angle brackets 18 attached to their inner ends. The brackets have bearing flanges 18a and spacer legs 18b. The lengths of the latter are graduated to provide varying offsets so that the stanchions of each group, on rotation, move in a common plane normal to the shafts, although the bearing legs of the brackets are spaced along the shafts. This construction adapts the stanchions for fanwise angular opening and closing movement between the positions shown in Figures 2 and 3. A plurality of ribs 19 extend between the groups of stanchions, the ends of each rib being secured to the outer ends of a pair of corresponding stanchions, one in each group. Diagonal braces 20 are secured to the rigs and stanchions adjacent their points of connection. The stanchions and ribs, conveniently formed from lengths of pipe, together with the braces constitute a canopy frame which is extendable to stretched or load-protecting position and retractable to open or collapsed position. A plurality of chains 22 spaced along the ribs and secured thereto limit the maximum separation between adjacent ribs when the stanchions are fanned out as shown in Figure 2 to stretch the canopy. The outermost ribs, designated 19a, have stiffening trusses 19b in planes substantially normal to their stanchions.

Crank arms 23 rotatable on each shaft 15 are pivotally connected to a web plate 24 welded to one of the stanchions supporting ribs 19a, the cranks at the two ends of the car being connected to stanchions of the same rib. By turning one of the arms 23, therefore, it is possible to rotate the ribs from the closely packed or collapsed position of Figure 3 to the spaced or stretched position of Figure 2 and vice versa. For turning arms 23, I mount gears 25 on shafts 15 and provide an upstanding housing 26 including spaced plates 27 at each end of the car, in which is journaled a shaft 29 having thereon an operating handwheel 30. Reduction gears 31 connect shafts 29 to gears 25.

Bows 32 are disposed in planes normal to the longitudinal axis of the car, coaxially therewith and spaced therealong. Each bow consists of two posts 33 and an arch 34 removably mounted thereon by pin-and-socket connections 35. The bows may conveniently be formed from pipe. The posts are removably inserted in sockets in the car floor and are provided with laterally extending arcuate guide segments 36, constituting a continuation of the curve of the arches. The bows slidingly support the ribs intermediate their ends, on movement between closed and open positions. By virtue of the sectional construction of the bows, the arches may be raised and swung back when the ribs are in collapsed position as shown in Figures 3 and 4, and the posts on the side of the car opposite the ribs may then be removed to afford clear access for loading and unloading.

A cover of any suitable flexible material, fabric or other, is fitted over the frame constituted by the ribs and stanchions and is laced or otherwise secured thereto. The cover is stretched taut as the frame is extended to the load-protecting position of Figure 2 and gathers in pleats or folds when the frame is retracted or collapsed on one side of the car, in open position as shown in Figure 3. The cover may be raised on either side since the crank arms may be engaged or disengaged selectively by operating clutches 40. The lowermost positions of the trusses 19b are determined as shown in Figure 2, by stop brackets 38 extending laterally from the car sides. Tie-down bars 39 extending through the brackets along the car sides but spaced therefrom, afford an anchorage for load-securing chains or strapping.

A reversing jaw clutch 40 at each end of the car permits either one of the two crank arms 23 to be driven by shaft 15. The movable crosshead 41 of the clutch is provided with an actuator bar 42 pivotally mounted on a bracket 43. A screw shaft 44 operable by a handwheel 45 cooperates with a nut 46 pivoted in the forked end of bar 42. Actuation of the clutch in one direction or the other causes the arms 23 to be locked selectively to shafts 15 whereby the cover may be raised on either side. Crosshead 41 of the clutch 40 slides on guides 47. When at either extreme of its travel, the crosshead engages one or the other of stop blocks 48. An indicator finger 49 on bar 42 shows when crosshead 41 has been moved against one of the blocks.

A tubular tie shaft 50 is journaled longitudinally in the car body below the floor thereof. Chain-and-sprocket drives 51 at both ends of the car connect shaft 50 to the gears 31. Thus, rotation of handwheel 30 at either end of the car causes rotation of shafts 15 at both ends, making possible the raising and lowering of the cover by one man.

Figure 9 shows a modification in which the actuator for each clutch 40 is a bar 52 extending through the plate 27 normal thereto. A connector bar 53 extending through shaft 50 and slidable therein, has radial arms 54 at its ends joined with bars 52 respectively. Thus the clutches at both ends of the car may be operated from either end.

The invention as described has many advantages. The canopy is light in weight, relatively inexpensive to manufacture, and requires no substantial alteration in the conventional structure of the car body. It remains in open or closed position by its own weight under all normal conditions and is also self-actuating after passing dead center. It may, nevertheless, be quickly and easily operated from closed to open position. It affords a high degree of protection from the weather since the sides of the cover lap the sides of the car yet provides full accessibility without obstruction for loading and unloading. The simplicity of the working parts reduces maintenance to a minimum even with the rough usage to which railroad equipment is ordinarily subject. A further advantage is that the cover is self-stowing, requiring no handling or storage when opened.

Although I have disclosed herein the preferred embodiment of my invention, I intend to cover as well any change or modification therein which may be made without departing from the spirit and scope of the invention.

I claim:

1. A vehicle comprising an elongated rectangular body having a load-carrying surface, bearings positioned at opposite ends of said body above the load-carrying surface, a pair of aligned shafts journaled in the respective bearings, a group of stanchions journaled on each shaft for fanwise opening and collapsing movement toward either side of said body, longitudinal ribs secured to the ends of corresponding stanchions of each group, a cover fitted over the ribs and stanchions, a reversing clutch having a driving element and two driven elements mounted on one of said shafts, a pair of crank arms connected to the respective driven elements and to the two outermost stanchions carried by the same shaft as that carrying the clutch, said clutch also including a crosshead movably supported on said body for establishing a driving connection between said driving element and either of said driven elements, and driving means for rotating the shaft on which the clutch is mounted to collapse said stanchions from an open position toward either side of said body on establishment of a driving connection between said driving element and the driven element to which is connected the crank arm leading to the outermost stanchion on the other side of said body.

2. A vehicle as described in claim 1 characterized by said driving means including a tie shaft journaled longitudinally in the vehicle body and drive means between the tie shaft and said first-mentioned shafts whereby movement of the stanchions at either end is accompanied by corresponding movement of the stanchions at the other.

3. A vehicle as described in claim 1 characterized by flexible tension means connecting adjacent ribs at points intermediate the ends thereof.

4. A vehicle as described in claim 1 characterized by said driving means including a manually operable wheel mounted at the end of the vehicle and power-transmission means connecting said wheel to one of said shafts.

5. A vehicle comprising an elongated rectangular body having a load-carrying surface, bearings positioned at opposite ends of said body above the load-carrying surface, a pair of aligned shafts journaled in the respective bearings, a group of stanchions journaled on each shaft for fanwise opening and collapsing movement toward either side of said body, longitudinal ribs secured to the ends of corresponding stanchions of each group, a cover fitted over said ribs and stanchions, a reversing clutch having a driving element and two driven elements mounted on one of said shafts, another similar clutch mounted on the other of said shafts, a first pair of crank arms connected to the respective driven elements of said first named clutch and to the two outermost stanchions carried by the same shaft as that carrying said first named clutch, a second pair of crank arms similarly connected to the clutch and stanchions carried by the other shaft, said clutches also including respective crossheads movably supported on said body for establishing driving connections between their respective driving elements and either of their driven elements, and driving means operatively connected to both said shafts for simultaneously rotating both shafts to collapse said stanchions from an open position toward either side of said body on establishment of driving connections between said driving elements and the driven elements which are connected the crank arms leading to the stanchions on the other side of said body.

6. A vehicle as described in claim 5 wherein said driving means includes a longitudinally extending tie shaft journaled in said body, handwheels journaled at each end of said body, transmission means connecting said handwheel and said tie shaft so that rotation of either handwheel rotates said tie shaft, and additional transmission means connecting said tie shaft and both said first named shafts for rotating said first named shafts on rotation of said tie shaft.

References Cited in the file of this patent

UNITED STATES PATENTS

| | | |
|---|---|---|
| 520,528 | Jones | May 29, 1894 |
| 968,828 | Beckley | Aug. 30, 1910 |
| 1,154,749 | Fee | Sept. 28, 1915 |
| 1,274,789 | Schedlbauer | Aug. 6, 1918 |
| 1,504,366 | Maynes | Aug. 12, 1924 |
| 1,598,471 | Williams | Aug. 31, 1926 |
| 2,132,328 | Tatum | Oct. 4, 1938 |
| 2,218,441 | Thompson | Oct. 15, 1940 |
| 2,587,027 | Black | Feb. 26, 1952 |
| 2,629,339 | Kovachick | Feb. 24, 1953 |

FOREIGN PATENTS

| | | |
|---|---|---|
| 183,825 | France | May 26, 1887 |
| 577,327 | France | June 3, 1924 |
| 12,713 | Great Britain | of 1849 |
| 31 | Great Britain | of 1852 |
| 18,153 | Great Britain | Aug. 7, 1912 |
| 72,933 | Netherlands | Aug. 15, 1953 |